Dec. 23, 1924.
L. C. REYNOLDS
1,520,598
DEVICE FOR STEERING AUTOS
Filed June 16, 1921
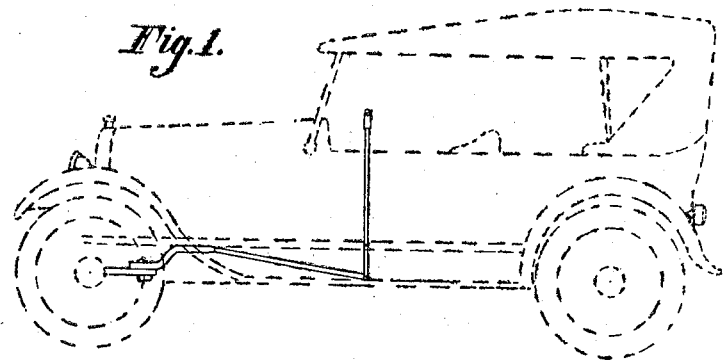
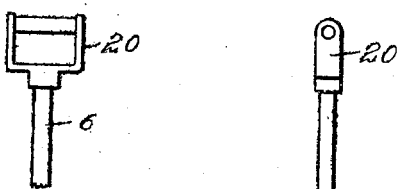
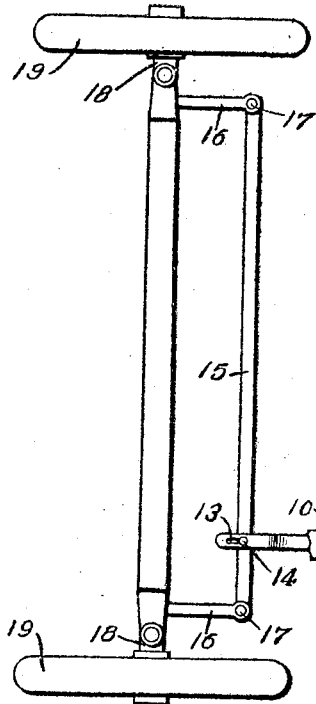
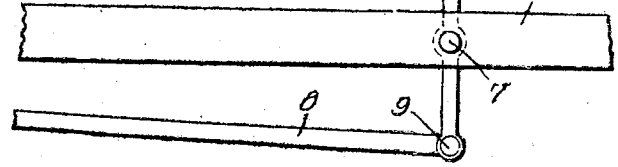
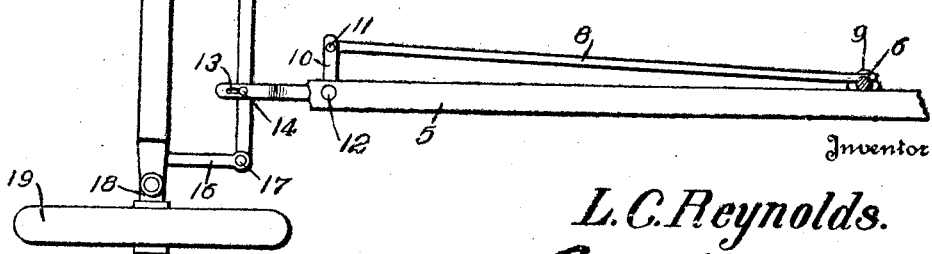
Inventor
L. C. Reynolds.

Patented Dec. 23, 1924.

1,520,598

UNITED STATES PATENT OFFICE.

LEWIS C. REYNOLDS, OF LOS ANGELES, CALIFORNIA.

DEVICE FOR STEERING AUTOS.

Application filed June 16, 1921. Serial No. 478,048.

*To all whom it may concern:*

Be it known that I, LEWIS C. REYNOLDS, a citizen of the United States, residing at Los Angeles, in the county of Los Angeles and State of California, have invented a new and useful Device for Steering Autos, of which the following is a specification.

This invention relates to motor vehicles, and more particularly to a novel form of steering means, whereby the operator may control the movements of the front wheels by one hand.

A further object of the invention is to provide a device of this character which will be so located as to permit of free use of the operator's limbs and feet in the operation of the clutch and brake pedals of the machine.

A still further object of the invention is to provide a device of this character which will not interfere with the passing of the operator to and from the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a fragmental plan view of a motor vehicle chassis showing a steering mechanism in accordance with the present invention as applied thereto.

Figure 2 is a fragmental side elevational view of the controlling arm and the rod which connects the controlling arm to the steering rod.

Figure 3 is a fragmental elevational view disclosing the operating rod and handle at the upper end thereof.

Figure 4 is a fragmental detail view of the handle portion of the controlling arm.

Referring to the drawing in detail, the reference character 5 designates one rail of a motor vehicle chassis, on which is pivotally supported a controlling arm 6, the controlling arm being of a length so that the upper extremity thereof, terminates at a point in proximity to the operator's seat of the motor vehicle.

The controlling arm 6 has pivotal connection with the rail 5 as at 7, the lower extremity of the arm 6 terminating at a point below the rail 5, where the same has pivotal connection with the operating rod 8 as at 9, the forward end of the rod 8 having pivotal connection with one arm of the bell crank lever 10, as at 11, the bell crank lever being pivotally connected to the under side of the side rail 5 as by means of the pivot pin 12.

The forward extremity of the bell crank lever 10 is provided with an elongated opening 13, which accommodates the pin 14 supported by the steering rod 15, which steering rod has pivotal connection with the arms 16, as at 17. These arms 16 have connection with the stub shafts 18 on which the front wheels 19 of the vehicle operate, so that movement of the rod 15 will result in relative movements of the arms 16 to accomplish the steering of the vehicle.

At the upper end of the controlling arm 6 is positioned a hand grip 20 which is disposed in proximity to the operator's seat, where the same may be conveniently grasped by one hand of the operator. Thus it will be seen that as the controlling arm 6 is moved forward or rearwardly, the front wheels 19 of the vehicle are moved accordingly, the operation of the arm 6 being accomplished by one hand of the operator leaving the other hand free to manipulate the gear shift lever and brake.

Having thus described the invention, what is claimed as new is:—

In a device of the class described, an axle having spindles mounted at the ends thereof, arms extending rearwardly from the spindles, a connecting rod for connecting the arms, said arm having a pin extending upwardly therefrom, a bell crank lever having an offset portion formed with an elongated opening to receive the pin and connect the connecting rod to the bell crank lever, an operating rod having connection with the bell crank lever, a controlling arm having a handle at its upper end and having its lower end pivotally connected with the operating rod and said controlling arm being pivotally connected to a support adjacent to its lower end.

In testimony that I claim the foregoing as my own, I have hereto affixed my signature in the presence of two witnesses.

LEWIS C. REYNOLDS.

Witnesses:
 JAMES GUY,
 WILLIAM GUNNARSSON.